United States Patent
Joho

(12)
(10) Patent No.: US 6,239,511 B1
(45) Date of Patent: May 29, 2001

(54) POWER STATION HAVING A GENERATOR WHICH IS DRIVEN BY A TURBINE, AS WELL AS A METHOD FOR OPERATING SUCH A POWER STATION

(75) Inventor: Reinhard Joho, Küttingen (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/369,839

(22) Filed: Aug. 9, 1999

(30) Foreign Application Priority Data

Aug. 31, 1998 (DE) .............................. 198 39 636

(51) Int. Cl.$^7$ ...................................... H02J 1/00
(52) U.S. Cl. .................. 307/38; 307/18; 307/23
(58) Field of Search ............... 307/18, 23, 38, 307/39; 290/40 R; 60/646

(56) References Cited

U.S. PATENT DOCUMENTS 3,643,437 * 2/1972 Birnbaum et al. .................... 60/73
4,529,887 * 7/1985 Johnson .............................. 290/40 R

* cited by examiner

Primary Examiner—Josie Ballato
Assistant Examiner—Sharon Polk

(74) Attorney, Agent, or Firm—Burns, Doane, Swecker & Mathis, L.L.P.

(57) ABSTRACT

A power station (10) includes a generator (13) which is driven by a turbine (11). The power station produces electrical power and outputs the electrical power to a network (17) via a generator switch (14). An electrical standby load (18) is also provided. When a network fault occurs, the generator is disconnected from the network by the generator switch and connected to the electrical standby load. The electrical standby load emulates the real load of the network that was present prior to the network fault, so that the voltage of the generator is stabilized at a constant phase difference or phase angle with respect to the voltage of the network that was present prior to the network fault. Alternatively, the value of the electrical standby load is adjusted during isolation of the generator from the network, to track the network while the generator is disconnected from the network and match the voltage phase angle of the generator to the network. Thus stability of the network is enhanced, because speed overshoots by the generator are avoided when the generator is disconnected from the network, and because the generator can be quickly reconnected to the network when the network fault is resolved after an extended time period, without performing a time consuming resynchronization process. For example, the generator can be reconnected to the network at a next current zero immediately following resolution of the network fault.

15 Claims, 5 Drawing Sheets

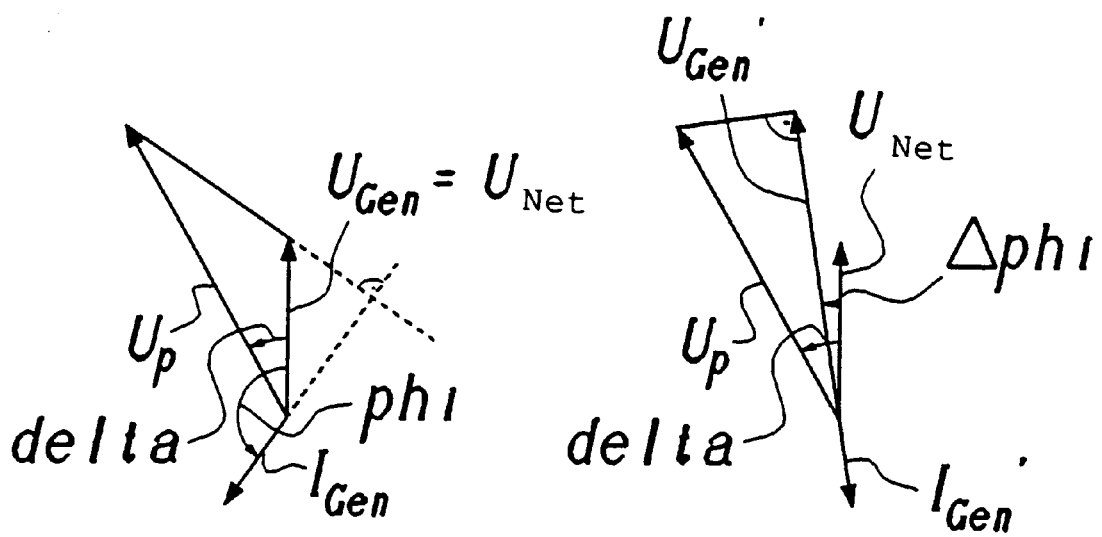
*Fig. 5*   *Fig. 6*
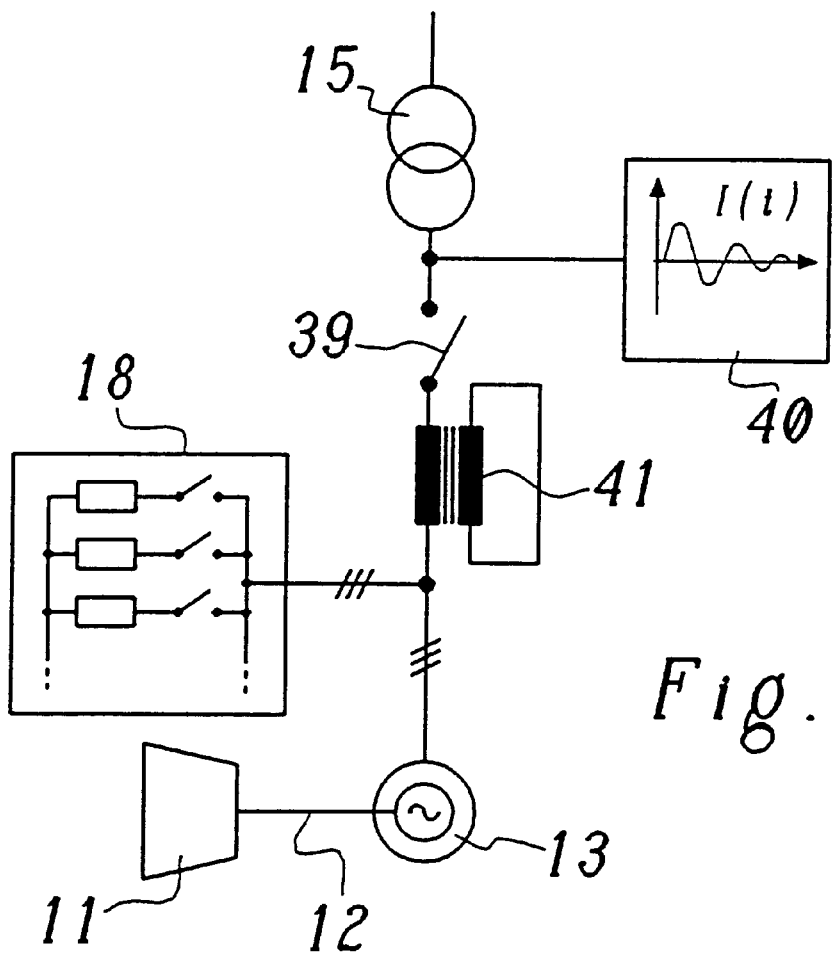
*Fig. 7*

POWER STATION HAVING A GENERATOR WHICH IS DRIVEN BY A TURBINE, AS WELL AS A METHOD FOR OPERATING SUCH A POWER STATION

BACKGROUND OF THE INVENTION

1. Field of the Invention

The present invention relates to the field of power station technology. It relates to a power station comprising a generator which is driven by a turbine, produces electrical power and outputs to a network via a generator switch. Such power stations are known in a wide range of forms from the prior art. The invention furthermore relates to a method for operation of such a power station.

2. Discussion of Background

As can be seen from the greatly simplified illustration in FIG. 1, the generator 13 which produces electrical power and is driven by a turbine 11 via a shaft 12 is connected, in a power station 10, via a generator switch 14, a transformer 15 and a network switch 16 to a network 17. If serious faults occur in the network 17, the generator 13 is isolated from the network 17 by opening the generator switch 14 immediately downstream of the generator terminals. Such a known fault is, for example, a line short. Normally, a time of up to 300 ms is available for subsequent reconnection, within which the criteria of incorrect angle and incorrect slip can still be tolerated.

If the fault cannot be sorted out or rectified before this time period has elapsed, time-consuming resynchronization of the generator 13 to the network 17 is required, during which the weakened network (other power stations may also have to be resynchronized first of all) may finally collapse. This risk will occur increasingly often in the future, since such networks are increasingly being operated at their capacity limit.

SUMMARY OF THE INVENTION

Accordingly, one object of the invention is to provide a novel power station and a novel method for its operation, by means of which reconnection of the generator which has been disconnected from the network after a fault can be ensured without tedious speed matching which may last up to several seconds.

In accordance with exemplary embodiments of the invention, an electrical standby load is provided within the power station. The electrical standby load is connected to the generator or power output of the power station when the network is disconnected, for example when a network fault occurs. This ensures that the generator will continue to operate in a mode that will allow the generator to be directly reconnected to the network, without undergoing a lengthy resynchronization process.

In accordance with exemplary embodiments of the invention, the electrical standby load is adjustable. This ensures that the electrical standby load can be optimally set to the respective operating conditions which exist shortly before a fault occurs in normal operation and causes the network to be disconnected from the power output of the power station. In other words, the electrical standby load is set to emulate the load presented by the network to the power station shortly before the occurrence of the fault.

In accordance with exemplary embodiments of the invention, the electrical standby load includes at least one resistor which can be connected to the output of the power station. This resistor is designed to be adjustable. In particular, the resistor includes a plurality of resistor elements which can be independently connected in parallel and which can have graduated resistance values. Thus, the value of the resistor can be adjusted by connecting and/or disconnecting appropriate ones of the plurality of resistor elements. The connection of the resistor elements can be performed via power semiconductor switches, preferably pairs of thyristors connected back-to-back. This provides a functionally reliable, easily adjustable, compact standby load that uses proven technology.

In accordance with exemplary embodiments of the invention, when a fault occurs in the network and the power station generator is isolated from the network by opening the generator switch, the terminals of the generator are connected to the electrical standby load at the same time that the generator switch is opened. The generator is then operated in an isolated mode while connected to the electrical standby load and disconnected from network. Once the network fault has been rectified, the electrical standby load is disconnected from the generator terminals again when the generator switch is closed to reconnect the generator to the network.

In accordance with exemplary embodiments of the invention, the resistance value of the electrical standby load is set to a value which corresponds approximately to a real load that was present during previous operation when the generator was connected to the network. This value is determined roughly from the immediately preceding magnitudes of the real load and field current of the generator. During isolation of the generator (i.e., while the generator is connected to the electrical standby load and disconnected from the network), the generator is operated to maintain a constant phase difference between the generator voltage and the voltage of the network by adaptation of this value and/or by fine-control of the field current. Thus, for the resistor standby load: $I_{gen}' \cdot U_{gen}' = I_{gen} \cdot U_{gen} \cdot \cos \phi$, where $I_{gen}$ is the generator current in normal operation before the fault, $U_{gen}$ is the generator voltage in normal operation before the fault, and $I_{gen}'$ is the generator current in the isolated mode and $U_{gen}'$ is the generator voltage in the isolated mode. This results in the phase difference $\Delta \phi$ between the generator voltage $U_{gen}'$ and the network voltage $U_{net}$ remaining constant. Thus, when the generator is reconnected to the network, the generator immediately feeds power into the network. This ensures that the generator can be reconnected to the network at any desired time, and makes a considerable contribution to network stability. The isolated mode works particularly advantageously if the operation of the turbine is controlled by a turbine regulator, and the control setting of the turbine regulator is kept constant ("frozen") in at least a first phase while operating in the isolated mode.

In accordance with another embodiment of the invention, the operation of the turbine is controlled by a turbine regulator, and the generator voltage is controlled by a voltage regulator. An adjustable electrical standby load is used, and the power and/or the generator voltage are/is varied during operation in the isolated mode by matched control of the turbine regulator, of the voltage regulator and of the adjustable electrical standby load and adaptation, resulting from this, of the phase difference of the generator voltage to the voltage of the network with the generator at a constant speed. This allows specific generator parameters to be varied in a controlled manner, in order to influence the reconnection capability to the network in an advantageous manner.

In accordance with another exemplary embodiment of the invention, the electrical standby load is connected when load shedding takes place in the network. This allows power oscillations to be prevented in a controlled manner. This is achieved particularly if the turbine is controlled by a turbine regulator, an adjustable electrical standby load is used, and the electrical standby load is continuously reduced to the value zero after being connected, matching the action of the turbine regulator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows the relative positions of the current and voltage vectors during normal operation of the power station;

FIG. 6 shows the relative positions of the current and voltage vectors during isolated mode operation according to the invention, with the constant phase difference $\Delta\phi$;

FIG. 7 shows an exemplary embodiment of a power station according to the invention with superconducting current limiters and power boosters;

DESCRIPTION OF THE PREFERRED EMBODIMENTS

Figure 2:
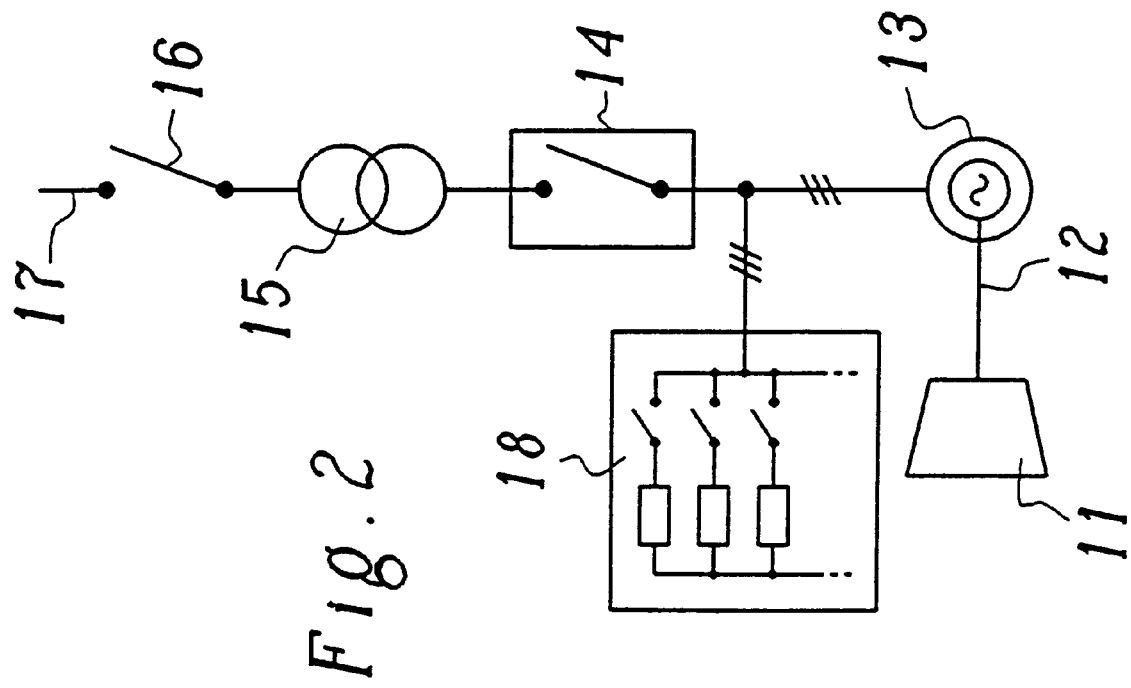
FIG. 2 shows the layout from FIG. 1 with an additional electrical standby load, which can be connected, according to the invention.
Figure 1:
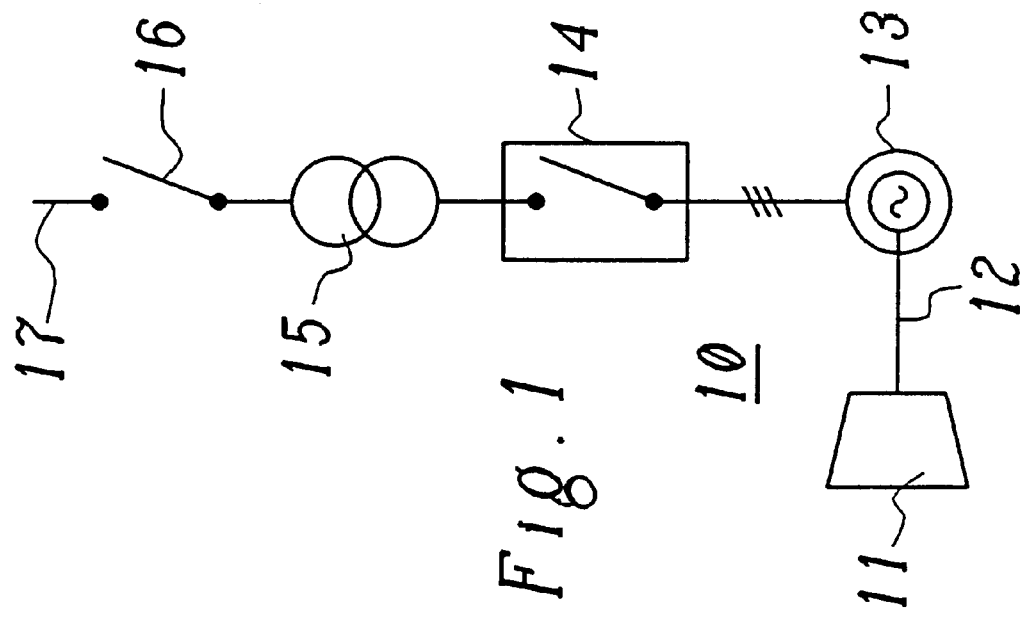
FIG. 1 shows a simplified layout of a power station connected to a network, as is widely known from the prior art.
Figure 8:
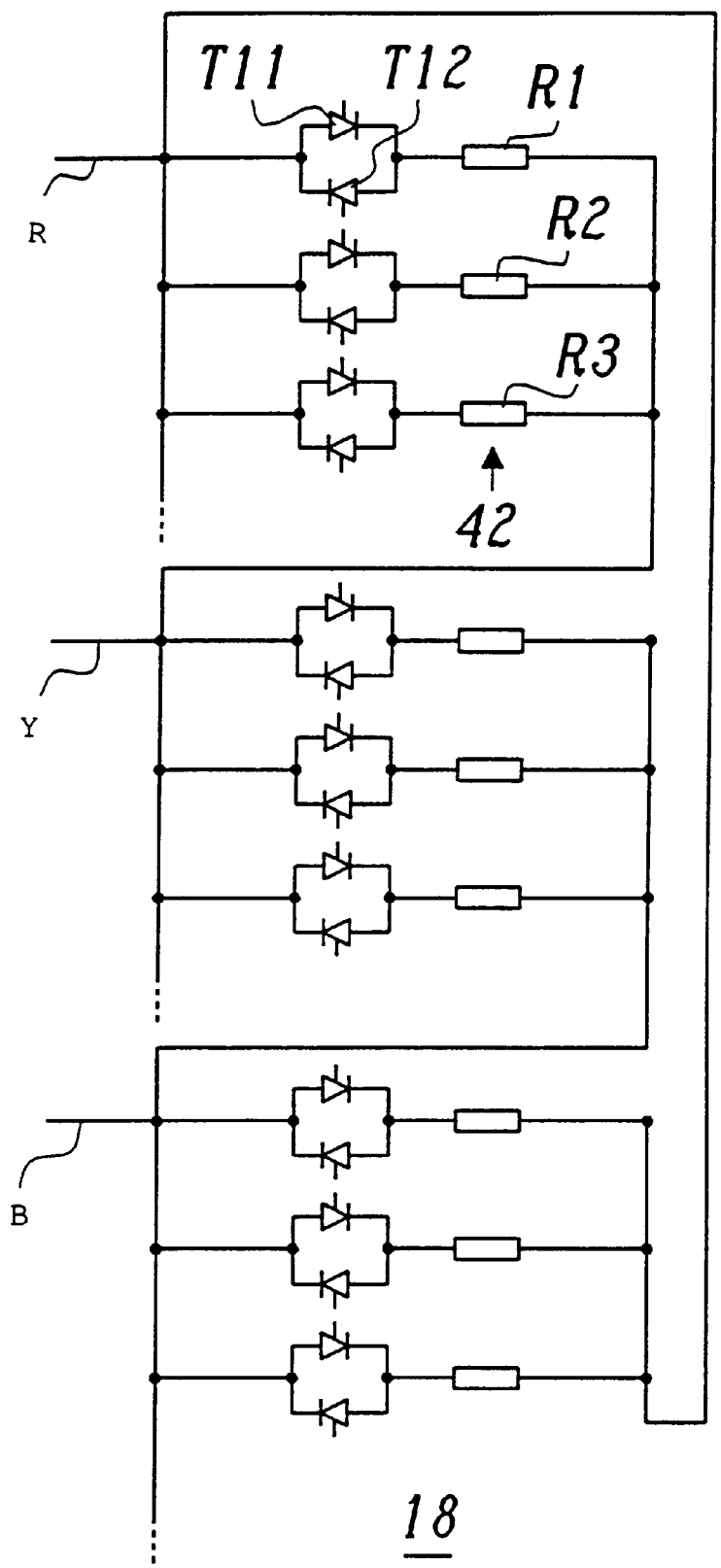
FIG. 8 shows a preferred exemplary embodiment for an adjustable electrical standby load, as can be used in the invention.

Referring now to the drawings, wherein like reference numerals designate identical or corresponding parts throughout the several views, FIG. 2 shows the power station 10 according to the prior art, as described in conjunction with the layout from FIG. 1, equipped with an additional electrical standby load 18, which can be connected, according to the invention. The electrical standby load 18 may be connected as required to the generator terminals, between the generator 13 and the generator switch 14. If the generator 13 has a three-phase output—as is assumed in FIG. 2—the electrical standby load 18 is preferably designed as shown in FIG. 8 as a three-phase switchable resistor, in which case a plurality of graduated-value resistor elements R1, . . . ,R3 (42) connected in parallel can each be connected and disconnected via a pair of thyristors T11, T12, connected back-to-back, for each phase R, Y and B. The graduation of the resistor elements R1, . . . ,R3 (42) allow finely graduated total resistance values to be set by suitable combinations, so that the electrical standby load can easily be adjusted relatively accurately by electronic triggering of the thyristors T11, T12.

In the event of a fault, the electrical standby load 18 is preferably used as described below: if the network monitoring (not shown in the figures) indicates a short in the network 17, a trip command is produced to open the generator switch 14. At the same time as the disconnection from the network 17 by the generator switch 14 (to be more precise: at the same time as the trip command), the generator terminals are connected to the electrical standby load 18 (by closing the thyristor switches in the standby load). The value of the electrical standby load 18 in this case corresponds as far as possible to the real load preceding the short. The turbine regulator responsible for the turbine 11 and the field current for the generator 13 are kept constant ("frozen") in at least a first phase while the fault is present. As already mentioned, the electrical standby load is preferably composed of thyristor-switched non-reactive resistor elements R1, . . . ,R3 (42).

Figure 3:
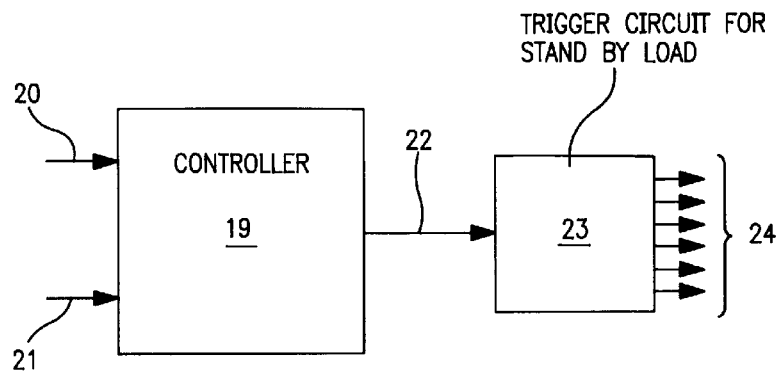
FIG. 3 shows a block diagram relating to the rough setting of the electrical standby load according to a preferred exemplary embodiment of the method according to the invention.

The resistor elements which need to be connected in the electrical standby load 18 are initially determined roughly from the frozen real power and the field current. According to the block diagram shown in FIG. 3, this is done by passing to a controller 19 the real power via an input 20 for the real power and the field current via an input 21 for the field current. The controller 19 then uses, for example, the ASA method to produce a corresponding resistance value for the electrical standby load, which value is passed on via a signal line 22 to a triggering circuit 23 for the standby load. The triggering circuit 23 then produces appropriate commands for the thyristors T11, T12 at individual control outputs 24 for the resistor elements R1, . . . ,R3 (42) in the electrical standby load 18.

Figure 4:
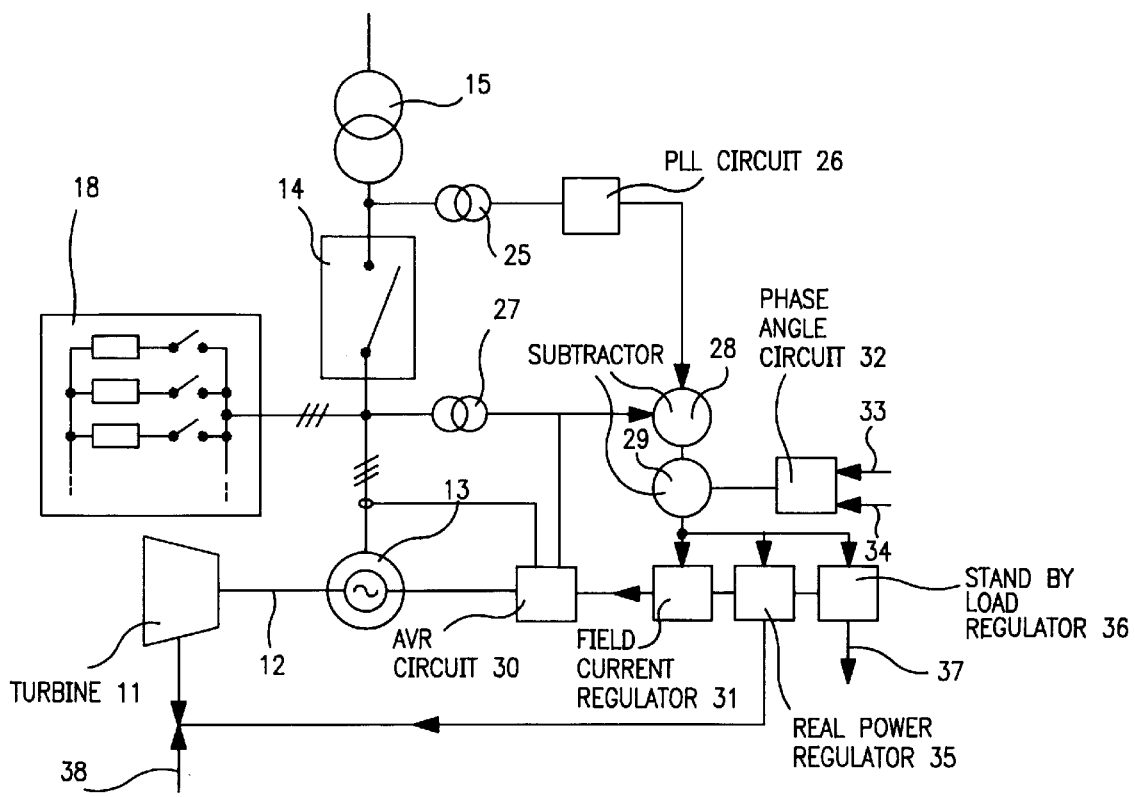
FIG. 4 shows a control layout for maintaining a constant phase difference between the generator voltage and the network by means of the electrical standby load operated in the isolated mode, according to a preferred exemplary embodiment of the invention.

Rough adjustment is followed, using the regulator scheme illustrated in FIG. 4, by stabilization of the generator voltage ($U_{gen}$) at a constant phase difference ($\Delta\phi$) with respect to the network voltage $U_{net}$. To do this, the network is simulated via a first transformer 25 with a downstream PLL circuit 26, and the resultant phase angle $\phi_{net}$ is passed to one input on the first subtractor (comparator) 28. The phase $\phi_{gen}$ of the generator voltage, tapped off at the generator terminals via a second transformer 27, is passed to the other input of the first subtractor 28. The resultant phase difference (actual value) is compared in a downstream second subtractor (comparator) 29 with the phase difference $\Delta\phi$ (set value) which is produced in a phase angle circuit 32 as a set value transmitter from the values of the real power present at the input 33 and the field current present at the input 34. The difference between the actual value and the set value at the output of the second subtractor 29 is passed to in each case one field current regulator 31, one real power regulator 35 and one standby load regulator 36. The field current regulator 31 uses an (optional) AVR circuit 30 to control the field current for the generator 13. The real power regulator 35 varies the real power 38 setting of the turbine regulator, which is equal to the frozen real power before the disconnection. The standby load regulator 36 controls the electrical standby load 18, which was previously set roughly, via the output 37.

The desired, constant phase difference $\Delta\phi$ ($\Delta$phi) is attained in accordance with FIG. 5 (relative positions of the current and voltage vectors during normal operation of the power station) and 6 (relative positions of the current and voltage vectors during isolated mode operation), where:

$$I_{gen} \cdot U_{gen}' = I_{gen} \cdot U_{gen} \cdot \cos \phi,$$

where $I_{gen}$ is the generator current, $U_{gen}$ is the generator voltage and $\phi$ is the phase angle during normal operation for the fault, and $I_{gen}'$ is the generator current, $U_{gen}'$ is the generator voltage during isolated mode operation (the vector for the rotor voltage $U_p$ shown in FIGS. 5 and 6 in this case indicates the angle of the rotor with respect to the stator voltage and is a measure of the field current). With the phase difference $\Delta\phi$ fixed in this way, the generator 13 immediately feeds power into the network 17 again after it is reconnected, without any synchronization process. Reconnection to the network 17 is thus ensured at any desired time. In most cases, the voltage will rise during isolated mode operation (that is to say with the generator 13 disconnected from the network 17 and operating on the electrical standby load 18) since the previous operation was overexcited which, from the point of view of the generator, is acceptable for the intended shorter time period. The resultant surge in reactive volt-amperes is even desirable on reconnection, as a "stability stimulus".

This changeover to the standby load 18 prevents speed overshoots, and it is possible to continue to operate the generator 13 in the isolated mode while the phase is still locked in the network 17, in a time interval which is determined by the energy absorption capacity of the standby load 18. When the generator switch 14 is closed again, the standby load 18 is disconnected. This is done at the next current zero by the thyristors T11, T12 in the standby load 18. The criterion for reconnection of the generator 13 without tedious speed matching can thus be ensured up to the region of several seconds. This makes a considerable contribution to the stability of the network 17.

According to FIG. 8, the standby load includes a number of resistor elements (R1, . . . ,R3 for the phase R) which can be connected. The connection process is carried out by thyristor pairs (T11, T12 for the phase R) connected back-to-back which, if necessary, can be reinforced by series or parallel connections. Series connection may be used in this case for voltage and/or redundancy reasons. Thyristors based on SiC are particularly suitable for use as switches. The resistor elements R1, . . . ,R3 (42) may have different values, that is to say they may be geometrically graduated, for example. Resistors having a high energy absorption capacity are advantageously used, such as those which are commercially available. The electrical standby load 18 can be designed in a comparatively space-saving manner. For example, the estimated cubicle volume for a rating of 500 MVA is 20 m³.

With matched control of turbine regulators, voltage regulators and the standby load according to FIG. 4, it is possible to attempt to reach a higher or lower power level and/or higher or lower voltage during isolated mode operation or else in accordance with a predetermined algorithm, without having to accelerate or brake the shaft 12. At the same time, the phase angle is matched to the network 12. In this case as well, problem-free reconnection is ensured over a lengthy time period.

Another possibility for use of the electrical standby mode 18 envisages the standby load being connected when low shedding is being carried out in the network 17. The electrical standby load is then reduced continuously to zero, matching the action which is then carried out by the power regulator. This type of use thus allows undesirable power oscillations or desynchronization to be reliably prevented.

In power stations having a number of generators, it is furthermore conceivable to assign each generator its own standby load, but to centralize certain components of the standby load such as the phase angle control (FIG. 4), that is to say to provide them as common components for all standby loads.

It is also possible in the control system shown in FIG. 4, rather than the synthetic network simulation using the PLL circuit 26, to transmit the information about the phase angle of the network 17 via a separate information channel from a network control point.

Instead of full-wave control for producing a combined resistive/inductive load, it is also conceivable to provide a phase-gating control for the thyristors T11, T12.

If the thermal capacity of the electrical standby load 18 is exhausted during operation, the power to the standby load can be reduced by the turbine regulator reducing the load in order, at least, to avoid speed overshoots. However, a new synchronization process must then be set up.

Other variation options within the invention are apparent from the illustration in FIG. 7: the isolation from the network is in this case carried out via a superconducting current limiter (SL current limiter 41), which ceases superconduction and conducts normally in the event of a short when the instantaneous current value is exceeded, and thus virtually decouples the generator 13 from the network. Alternatively, a PTC (Positive Temperature Coefficient) current limiter may be used instead of the SL current limiter 41. The generator 13 is thus isolated from the fault current, and this is advantageous for the shaft run and for the stator winding. In conjunction with the use of such limiters, it is also possible to use an auxiliary switch 40 between the network and a switch 39, by means of which a synthetic short current can be fed in, and the network protection can be caused to respond in this way.

Figure 9:
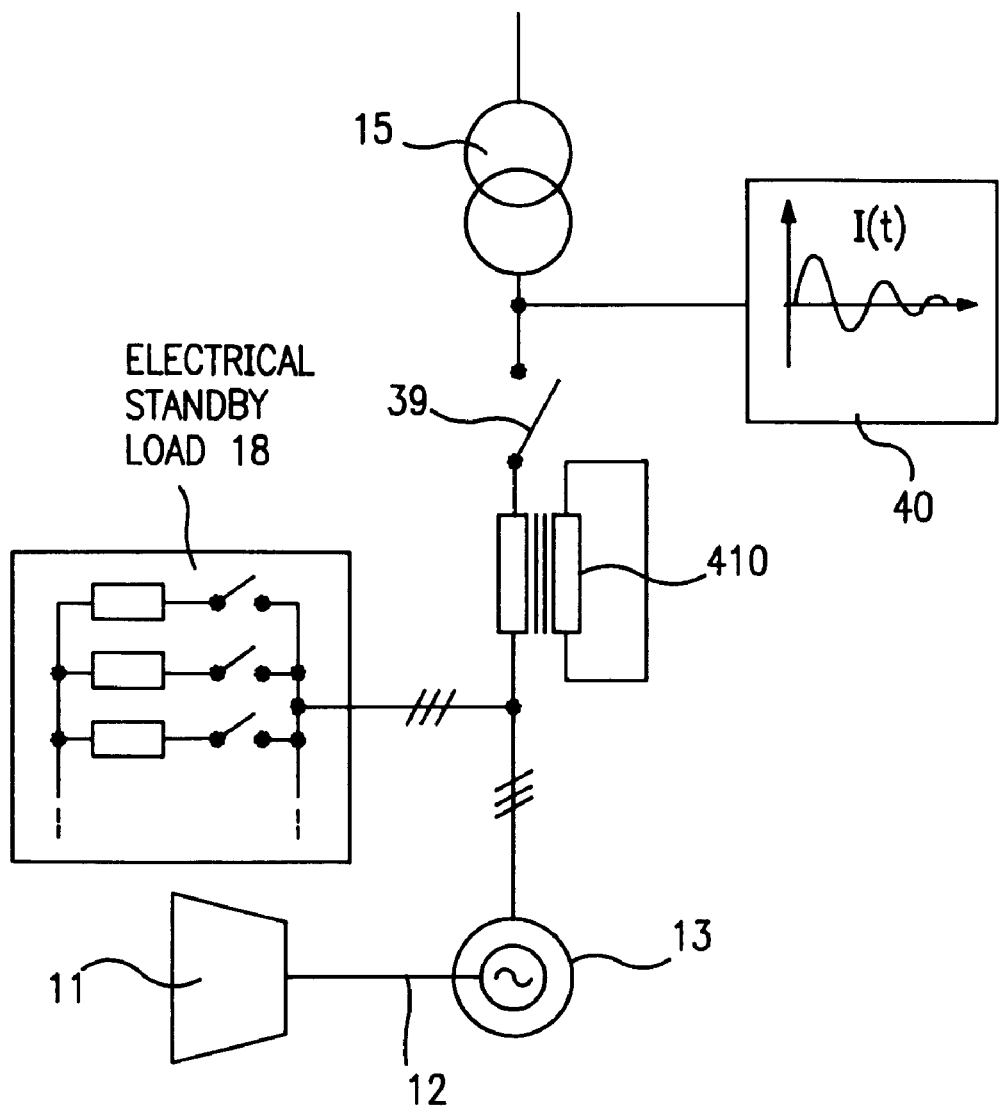
FIG. 9 shows an exemplary embodiment of a power station according to the invention with non-superconducting current limiters.

FIG. 9 illustrates a PTC current limiter 410 that is used instead of the superconducting current limiter 41.

Obviously, numerous modifications and variations of the present invention are possible in light of the above teachings. It is therefore to be understood that, within the scope of the appended claims, the invention may be practiced otherwise then as specifically described herein.

What is claimed as new and desired to be secured by Letters Patent of the United States is:

1. A power station, comprising:
   an electric generator driven by a turbine;
   an electrical standby load having an adjustable value and comprising a plurality of resistance elements and a corresponding plurality of switching elements for independently connecting and disconnecting each of the plurality of switching elements in parallel across terminals of the electrical standby load, where in the adjustable value of the electrical standby load is based on the resistance values of ones of the plurality of resistance elements that are connected between the terminals of the electrical standby load, and wherein the resistance elements have graduated resistance values; and
   a switching mechanism arranged between the electric generator and the electrical standby load and between the electric generator and a network, to alternately connect power output from the electric generator to one of the electrical standby load and the network.

2. The power station of claim 1, wherein the switching elements are power semiconductor switches.

3. The power station of claim 2, wherein the switching elements comprise pairs of thyristors connected back-to-back.

4. The power station of claim 1, wherein the switching mechanism includes a current limiter between the power output and the network.

5. The power station of claim 1, wherein the current limiter is a superconducting current limiter.

6. The power station of claim 1, wherein the current limiter is a Positive Temperature Coefficient resistor current limiter.

7. A method for operating a power station, comprising the steps of:
   simultaneously disconnecting power generated by the station from a network and connecting the power generated by the station to an electrical standby load, in the event of a fault in the network; and
   disconnecting the power generated by the station from the electrical standby load and connecting the power generated by the station to the network, once the fault in the network has been rectified.

8. The method of claim 7, further comprising the step of setting the electrical standby load to a first resistance value corresponding approximately to a real load that was present during previous operation of the electric generator prior to the fault in the network.

9. The method of claim 8, further comprising the steps of:
   determining the first resistance value based on magnitudes of the real load and field current of the electric generator present immediately prior to the fault in the network; and
   maintaining a constant phase difference ($\Delta\phi$) between the electric generator voltage and a voltage of the network while the power output is connected to the electrical standby load, by performing at least one of a) adapting the resistance value of the electrical standby load and b) controlling the field current.

10. The method of claim 9, further comprising the step of:
    controlling the constant phase difference ($\Delta\phi$) to satisfy $I_{gen}' \cdot U_{gen}' = I_{gen} \cdot U_{gen} \cdot \cos\phi$, where $I_{gen}$ is the electric generator current in normal operation before occurrence of the fault in the network, $U_{gen}$ is the electric generator voltage in normal operation before occurrence of the fault in the network, $I_{gen}'$ is the electric generator current while the power output is connected to the electrical standby load and disconnected from the network, and $U_{gen}'$ is the electric generator voltage while the power output is connected to the electrical standby load and disconnected from the network.

11. The method of claim 7, wherein the operation of the turbine is controlled by a turbine regulator, and the method further comprises the step of:
    keeping the control setting of the turbine regulator constant in at least a first phase while the power output is connected to the electrical standby load and disconnected from the network.

12. The method of claim 7, wherein operation of the turbine is controlled by a turbine regulator and a voltage of the generator is controlled by a voltage regulator, the method further comprising the step of:
    varying at least one of a power output of the generator and a voltage of the generator while the power output is connected to the electrical standby load and disconnected from the network, by matching control of a) the turbine regulator, b) the voltage regulator, and c) the resistance value of the electrical standby load, to maintain both a constant phase difference between the generator voltage and a voltage of the network and a constant speed of the generator.

13. A method for operating a power station, wherein the power station includes an electric generator driven by a turbine, a power output for outputting electrical power produced by the electric generator, an electrical standby load having an adjustable value and comprising a plurality of resistance elements and a corresponding plurality of switching elements for independently connecting and disconnecting each of the plurality of switching elements in parallel across terminals of the electrical standby load, wherein the adjustable value of the electrical standby load is based on the resistance values of ones of the plurality of resistance elements that are connected between the terminals of the electrical standby load, and wherein the resistance elements have graduated resistance values, and a switching mechanism having at least two modes, wherein in a first mode, the switching mechanism connects the power output to a network and isolates the power output from the electrical standby load, and in a second mode, the switching mechanism connects both the network and the electrical standby load to the power output, the method comprising the step of:
    changing from the first mode to the second mode via the switching mechanism, when load shedding occurs in the network.

14. The method of claim 13, wherein the turbine is controlled by a turbine regulator, the method further comprising the step of:
    continuously reducing the value of the electrical standby load to zero to match an action of the turbine regulator, while the switching mechanism is in the second mode.

15. The method of claim 13, wherein the switching mode has a third mode, and in the third mode the switching mechanism connects the power output to the electrical standby load and isolates the power output from the network, and the method further comprises the steps of:
    changing from the first mode to the third mode via the switching mechanism when a fault in the network occurs; and
    changing from the third mode to the first mode via the switching mechanism when the fault in the network is rectified.

* * * * *